US012398950B2

(12) United States Patent
Kozinski et al.

(10) Patent No.: US 12,398,950 B2
(45) Date of Patent: Aug. 26, 2025

(54) METHOD OF OPERATING A LIGHTING ASSEMBLY IN A REFRIGERATOR APPLIANCE

(71) Applicant: Haier US Appliance Solutions, Inc., Wilmington, DE (US)

(72) Inventors: Kyle Andrew Kozinski, Louisville, KY (US); Jordan Waymeyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 182 days.

(21) Appl. No.: 18/357,396

(22) Filed: Jul. 24, 2023

(65) Prior Publication Data

US 2025/0035372 A1 Jan. 30, 2025

(51) Int. Cl.
 *F25D 27/00* (2006.01)
 *H04N 23/74* (2023.01)
 *H05B 47/12* (2020.01)
 *H05B 47/155* (2020.01)
 *H05B 47/175* (2020.01)

(52) U.S. Cl.
 CPC ........... *F25D 27/005* (2013.01); *H04N 23/74* (2023.01); *H05B 47/12* (2020.01); *H05B 47/155* (2020.01); *H05B 47/175* (2020.01); *F25D 2500/06* (2013.01); *F25D 2700/06* (2013.01)

(58) Field of Classification Search
 CPC ...... F25D 27/00; F25D 27/005; F25D 29/008; F25D 2327/00; F25D 2500/06; F25D 2700/06
 See application file for complete search history.

(56) References Cited

U.S. PATENT DOCUMENTS

| 7,495,561 | B2 * | 2/2009 | Bodin | G06Q 10/08 |
| | | | | 340/572.1 |
| 7,588,340 | B2 | 9/2009 | Bauer et al. | |
| 8,490,426 | B2 | 7/2013 | Kim | |
| 9,195,960 | B2 * | 11/2015 | Kim | G06Q 10/087 |
| 10,077,936 | B2 * | 9/2018 | Frommelt | F25D 27/005 |
| 10,371,438 | B2 * | 8/2019 | Ammerman | F21V 33/0044 |
| 10,430,855 | B2 * | 10/2019 | Pas | A47F 11/10 |
| 2014/0169640 | A1 * | 6/2014 | Park | G06F 7/06 |
| | | | | 382/110 |

(Continued)

FOREIGN PATENT DOCUMENTS

CN 213040859 U 4/2021
CN 213365226 U * 6/2021 ............. F25D 23/02

(Continued)

*Primary Examiner* — Andrew Roersma
(74) *Attorney, Agent, or Firm* — Dority & Manning, P.A.

(57) ABSTRACT

A refrigerator appliance includes a chilled chamber comprising a plurality of storage locations, a lighting assembly comprising a plurality of lighting zones corresponding to the plurality of storage locations, and a controller in operative communication with the lighting assembly. The controller is configured to receive a request to identify an object stored in the chilled chamber, determine that the object is located within a target location of the plurality of storage locations, identify a target lighting zone of the plurality of lighting zones that corresponds to the target location, and illuminate the target lighting zone.

20 Claims, 6 Drawing Sheets

(56) References Cited

U.S. PATENT DOCUMENTS

| | | | | |
|---|---|---|---|---|
| 2015/0035432 A1* | 2/2015 | Kendall | ............... | F25D 27/005 |
| | | | | 315/76 |
| 2017/0005052 A1 | 1/2017 | Chen et al. | | |
| 2019/0311319 A1* | 10/2019 | Cote | .................... | G06Q 10/087 |
| 2020/0041200 A1* | 2/2020 | No | ..................... | G05B 19/048 |
| 2020/0088463 A1* | 3/2020 | Jeong | ..................... | G06F 3/167 |
| 2020/0132361 A1* | 4/2020 | Carlotto | ................. | F25D 11/02 |
| 2020/0284499 A1* | 9/2020 | Burke | ................ | F25D 23/066 |
| 2021/0262725 A1* | 8/2021 | Hong | ..................... | F25D 25/00 |
| 2023/0400249 A1* | 12/2023 | Shin | .......................... | G06T 7/70 |
| 2024/0027124 A1* | 1/2024 | Kim | ........................ | F25D 27/00 |

FOREIGN PATENT DOCUMENTS

| | | | | |
|---|---|---|---|---|
| DE | 102017114798 A1 | | 10/2018 | |
| DE | 102017011959 B4 * | | 10/2021 | ............. F21V 15/01 |
| EP | 3869133 A1 | | 8/2021 | |
| KR | 1020060066286 A * | | 6/2006 | |
| KR | 101162755 B1 * | | 6/2012 | ............. F25D 23/00 |
| KR | 1020180017741 A * | | 2/2018 | ............ F25D 29/00 |
| WO | WO-2018086502 A1 * | | 5/2018 | ........... F25D 27/005 |
| WO | WO2022100820 A1 | | 5/2022 | |

* cited by examiner

METHOD OF OPERATING A LIGHTING ASSEMBLY IN A REFRIGERATOR APPLIANCE

FIELD OF THE INVENTION

The present subject matter relates generally to refrigerator appliances, and more particularly to lighting systems for refrigerator appliances.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

In addition, conventional refrigerator appliances include lighting systems that illuminate the chilled chamber. However, these conventional lighting systems are intended only to improve visibility within the chamber. In this regard, these conventional lighting systems are passively operated, e.g., the lighting system is activated when a door switch indicates that the door is open and the lighting system is deactivated when the door switch indicates that the door is closed. Moreover, conventional lighting systems lack versatility and the ability to communicate information regarding appliance operation. In this regard, even when the lighting systems are energized, they operate at a single, uniform intensity and color throughout the chilled chamber.

Accordingly, a refrigerator appliance with an improved lighting system would be useful. More particularly, a lighting system for a refrigerator appliance that provides versatile lighting configurations, improved aesthetics, and a more informative user experience would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance is provided including a cabinet, a chilled chamber defined within the cabinet, the chilled chamber comprising a plurality of storage locations, a lighting assembly comprising a plurality of lighting zones corresponding to the plurality of storage locations, and a controller in operative communication with the lighting assembly. The controller is configured to receive a request to identify an object stored in the chilled chamber, determine that the object is located within a target location of the plurality of storage locations, identify a target lighting zone of the plurality of lighting zones that corresponds to the target location, and illuminate the target lighting zone.

In another exemplary embodiment, a method of operating a lighting assembly of a refrigerator appliance is provided. The refrigerator appliance includes a chilled chamber defined within a cabinet, the chilled chamber comprising a plurality of storage locations, and the lighting assembly comprising a plurality of lighting zones corresponding to the plurality of storage locations. The method includes receiving a request to identify an object stored in the chilled chamber, determining that the object is located within a target location of the plurality of storage locations, identifying a target lighting zone of the plurality of lighting zones that corresponds to the target location, and illuminating the target lighting zone.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
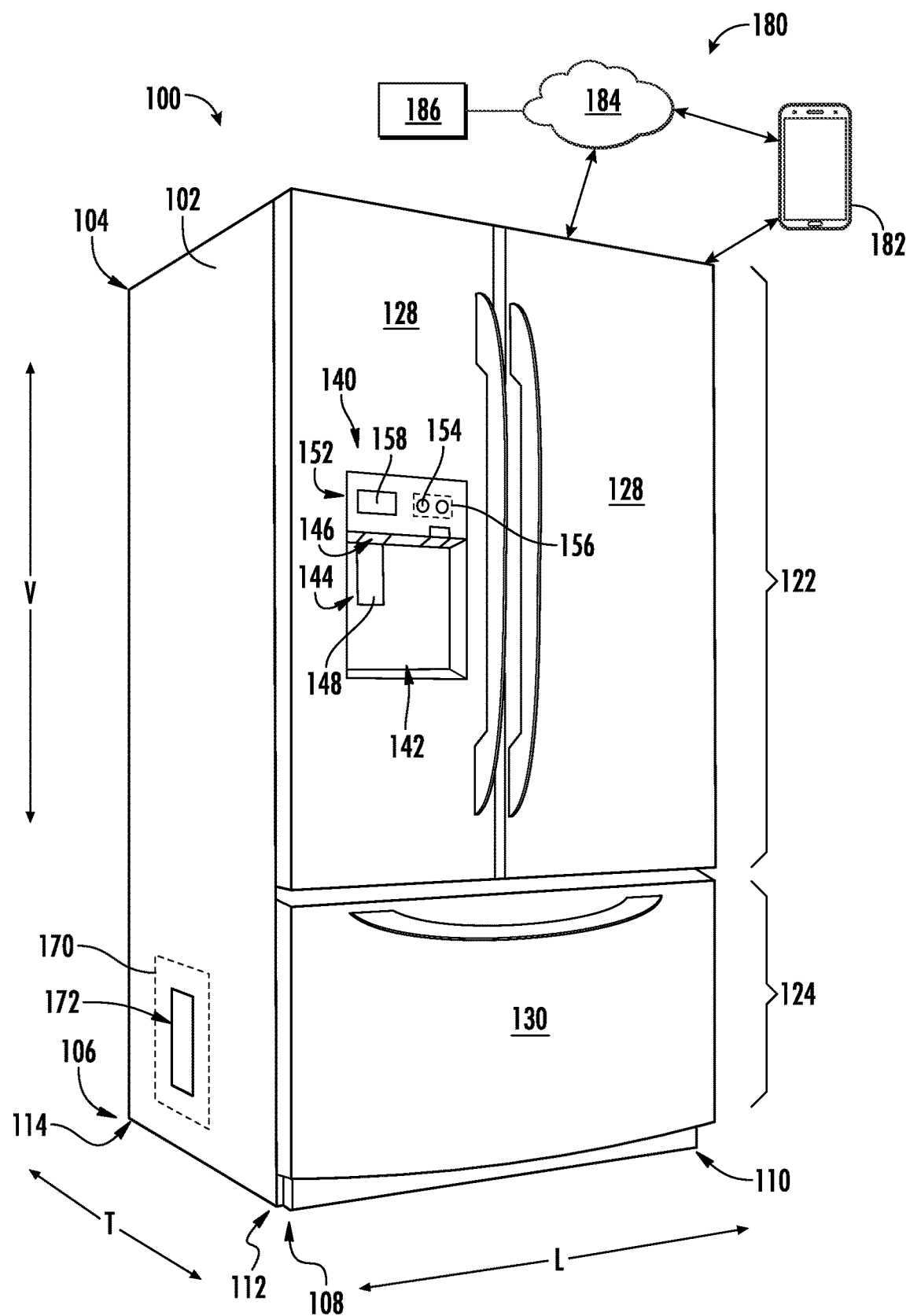
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

FIG. 1 provides a perspective view of a refrigerator appliance 100 according to an exemplary embodiment of the present subject matter. Refrigerator appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Cabinet 102 defines chilled chambers for receipt of food items for storage. In particular, cabinet 102 defines fresh food chamber 122 positioned at or adjacent top 104 of cabinet 102 and a freezer chamber 124 arranged at or adjacent bottom 106 of cabinet 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well, such as other appliances including fluid dispensers. Consequently, the description set forth herein is for illustrative purposes only and is not intended to be limiting in any aspect to any particular appliance or configuration.

Refrigerator doors 128 are rotatably hinged to an edge of cabinet 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. To prevent leakage of cool air, refrigerator doors 128, freezer door 130, and/or cabinet 102 may define one or more sealing mechanisms (e.g., rubber gaskets, not shown) at the interface where the doors 128, 130 meet cabinet 102. It should be appreciated that doors having a different style, position, or configuration are possible within the scope of the present subject matter.

Figure 2:
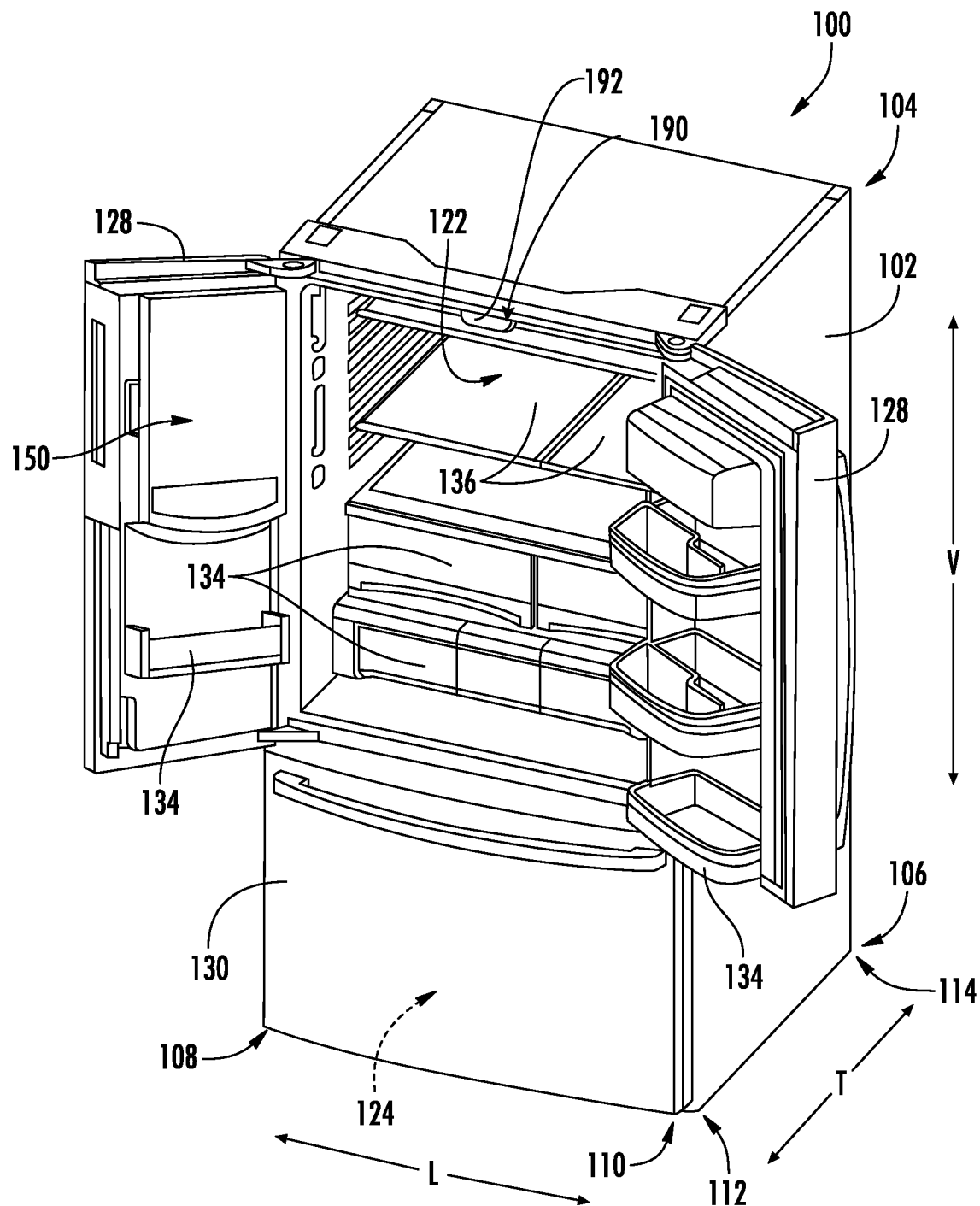
FIG. 2 provides a perspective view of the exemplary refrigerator appliance of FIG. 1, with the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element.

The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring again briefly to FIG. 1, according to an exemplary embodiment, cabinet 102 also defines a mechanical compartment 170 at or near the bottom 106 of the cabinet 102 for receipt of a hermetically sealed cooling system 172. In general, sealed cooling system 172 is configured for transporting heat from the inside of refrigerator appliance 100 to the outside (e.g., by executing a vapor-compression cycle or another suitable refrigeration cycle). As is generally understood by those of skill in the art, the hermetically sealed system 172 contains a working fluid, e.g., refrigerant, which flows between various heat exchangers of the sealed system 172 where the working fluid changes phases while transferring thermal energy.

In this regard, as understood by one having ordinary skill in the art, sealed system 172 may include a compressor, a condenser, an expansion device, and one or more evaporators connected in series by a fluid conduit that is charged with a refrigerant. Within sealed system 172, refrigerant flows into the compressor, which operates to increase the pressure of the refrigerant. This compression of the refrigerant raises its temperature, which is lowered by passing the refrigerant through the condenser. Within the condenser, heat exchange with ambient air takes place so as to cool the refrigerant. A condenser fan may be used to pull air across the condenser, so as to provide forced convection for a more rapid and efficient heat exchange between the refrigerant within the condenser and the ambient air. Thus, as will be understood by those skilled in the art, increasing air flow across the condenser can, e.g., increase the efficiency of the condenser by improving cooling of the refrigerant contained therein.

An expansion device (e.g., an electronic expansion valve, capillary tube, or other restriction device) receives refrigerant from the condenser. From the expansion device, the refrigerant enters the evaporator. Upon exiting the expansion device and entering the evaporator, the refrigerant drops in pressure. Due to the pressure drop and/or phase change of the refrigerant, the evaporator is relatively cool. An evaporator fan is typically provided at each the evaporator, e.g., to force air across and around the at least one evaporator to transfer thermal energy from the air to the evaporator (and more particularly, to the working fluid or refrigerant therein).

In this manner, a flow of cooling air exits the evaporator and may be distributed to one or more of the chilled chambers 122 and/or 124. Specifically, one or more ducts may extend between the mechanical compartment 170 and the chilled chambers 122 and/or 124 to provide fluid communication therebetween, e.g., to provide the chilled air from the hermetically sealed cooling system 172, e.g., from an evaporator thereof, to one or more of the chilled chambers 122 and/or 124.

The sealed system 172 described herein is provided by way of example only. Thus, it is within the scope of the present subject matter for other configurations of the refrigeration system to be used as well. For example, according to alternative embodiments, sealed system 172 may include additional components, e.g., at least one additional evaporator, compressor, expansion device, and/or condenser. For example, refrigerator appliance 100 may have two or more split evaporators, e.g., one dedicated primarily to cooling fresh food chamber 122 and one dedicated primarily to cooling freezer chamber 124. In addition, alternative plumbing configurations, valves, and flow regulators may be used to route refrigerant throughout sealed system 172.

In some embodiments, refrigerator appliance 100 also includes one or more sensors that may be used to facilitate improved operation of refrigerator appliance 100, such as described below. For example, in order to obtain temperature measurements within one or more chilled chambers 122, 124 (or regions/zones within chilled chambers 122, 124), refrigerator appliance 100 may include a plurality of temperature sensors (not shown). Controller 156 may be communicatively coupled with the temperature sensors, may receive signals from these temperature sensors that correspond to the temperature of an atmosphere or air within their respective locations, and may implement responsive action, e.g., by directing more or less cooling air toward that region or chamber.

As used herein, "temperature sensor" or the equivalent is intended to refer to any suitable type of temperature measuring system or device positioned at any suitable location for measuring the desired temperature. Thus, for example, the temperature sensors may be any suitable type of temperature sensor, such as a thermistor, a thermocouple, a resistance temperature detector, etc. In addition, the temperature sensors may be positioned at any suitable location and may output a signal, such as a voltage, to a controller that is proportional to and/or indicative of the temperature of the air surrounding the temperature sensors. Although exemplary positioning of temperature sensors is described and illustrated herein, it should be appreciated that refrigerator appliance 100 may include any other suitable number, type, and position of temperature and/or other sensors according to alternative embodiments.

Referring still to FIG. 1, a schematic diagram of an external communication system 180 will be described according to an exemplary embodiment of the present subject matter. In general, external communication system 180 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 180 may be used to transfer data or other information to improve performance of one or more external devices or appliances and/or improve user interaction with such devices.

For example, external communication system 180 permits controller 156 of refrigerator appliance 100 to communicate with a separate device external to refrigerator appliance 100, referred to generally herein as an external device 182. As described in more detail below, these communications may be facilitated using a wired or wireless connection, such as via a network 184. In general, external device 182 may be any suitable device separate from refrigerator appliance 100 that is configured to provide and/or receive communications, information, data, or commands from a user. In this regard, external device 182 may be, for example, a personal phone, a smartphone, a tablet, a laptop or personal computer, a wearable device, a smart home system, or another mobile or remote device.

In addition, a remote server 186 may be in communication with refrigerator appliance 100 and/or external device 182 through network 184. In this regard, for example, remote server 186 may be a cloud-based server 186, and is thus located at a distant location, such as in a separate state, country, etc. According to an exemplary embodiment, external device 182 may communicate with a remote server 186 over network 184, such as the Internet, to transmit/receive data or information, provide user inputs, receive user notifications or instructions, interact with or control refrigerator appliance 100, etc. In addition, external device 182 and remote server 186 may communicate with refrigerator appliance 100 to communicate similar information.

In general, communication between refrigerator appliance 100, external device 182, remote server 186, and/or other user devices or appliances may be carried using any type of wired or wireless connection and using any suitable type of communication network, non-limiting examples of which are provided below. For example, external device 182 may be in direct or indirect communication with refrigerator appliance 100 through any suitable wired or wireless communication connections or interfaces, such as network 184. For example, network 184 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 180 is described herein according to an exemplary embodiment of the present subject matter. However, it should be appreciated that the exemplary functions and configurations of external communication system 180 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 3:
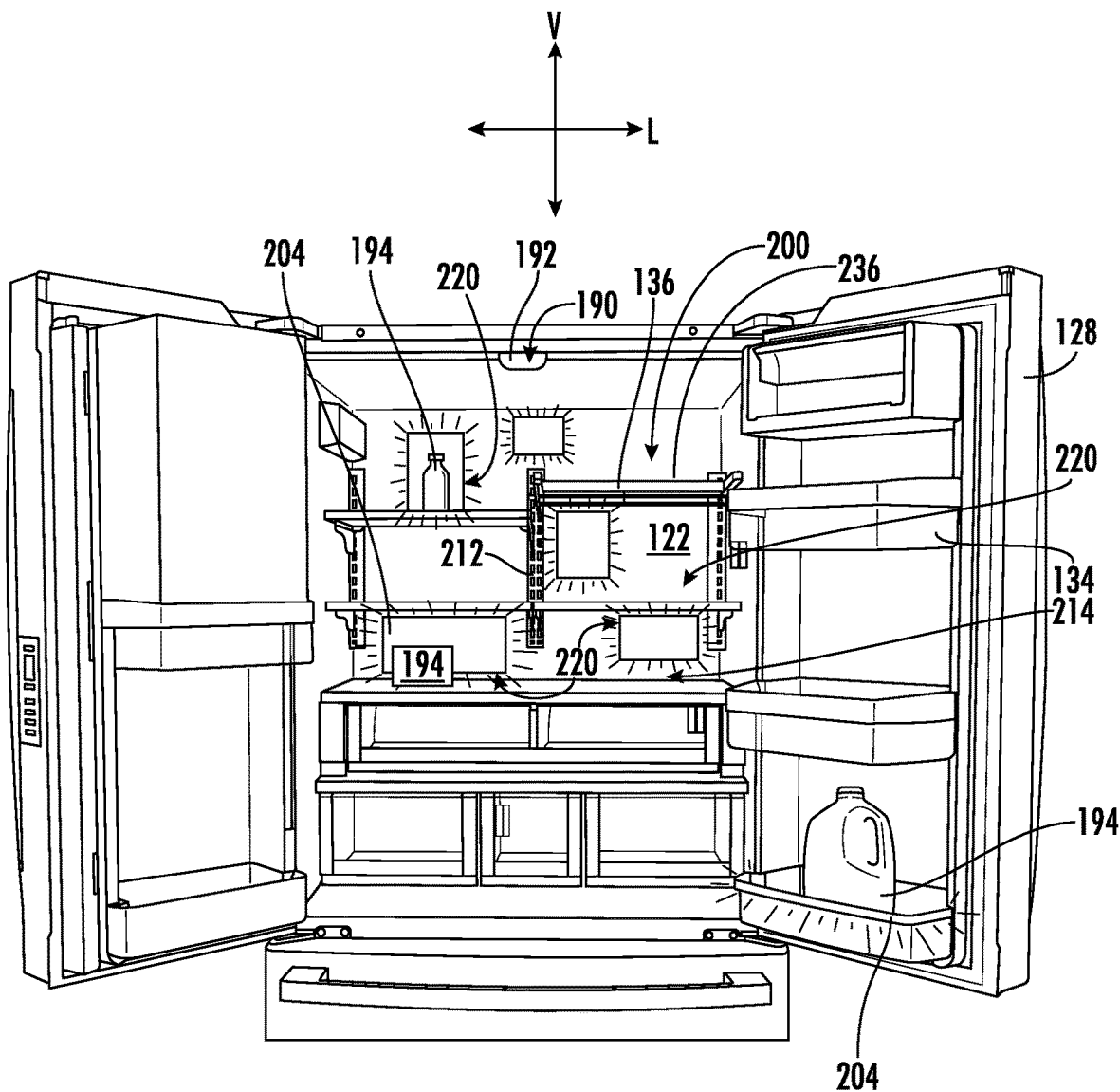
FIG. 3 provides a front view of the exemplary refrigerator appliance of FIG. 1, with the doors of the fresh food chamber shown in an open position.

Referring now generally to FIGS. 2 and 3, refrigerator appliance 100 can further include an inventory management system 190 that is generally configured to monitor one or more chambers of refrigerator appliance 100 to monitor the addition and/or removal of inventory. More specifically, as described in more detail below, inventory management system 190 can include a plurality of sensors, cameras, or other detection devices that are used to monitor fresh food chamber 122 and/or freezer chamber 124 to detect objects 194 (e.g., food items, beverages) that are positioned in or removed from fresh food chamber 122 and/or freezer chamber 124. In this regard, inventory management system 190 can use data from each of these devices to obtain a complete representation or knowledge of the identity, position, and/or other qualitative or quantitative characteristics of objects 194 within fresh food chamber 122 and/or freezer chamber 124. Although inventory management system 190 is described herein as monitoring fresh food chamber 122 for the detection of objects 194, it should be appreciated that aspects of the present disclosure can be used to monitor objects or items in any other suitable appliance, chamber (e.g., freezer chamber 124), etc.

Inventory management system 190 can include a camera assembly 192 coupled to refrigerator appliance 100 (e.g., to cabinet 102) that is generally positioned and configured for obtaining images, video, and/or audio of refrigerator appliance 100 during operation. Specifically, according to the illustrated embodiment, camera assembly 192 includes one or more cameras that are mounted to cabinet 102, to refrigerator doors 128, or are otherwise positioned in view of fresh food chamber 122. Although camera assembly 192 is described herein as being used to monitor fresh food chamber 122 of refrigerator appliance 100, it should be appreciated that aspects of the present disclosure can be used to monitor any other suitable regions of any other suitable appliance, e.g., such as freezer chamber 124. As best shown in FIGS. 2 and 3, camera assembly 192 is mounted to cabinet 102 at a front opening of fresh food chamber 122 and is oriented to have a field of view directed across the front opening and/or into fresh food chamber 122.

Although camera assembly 192 is illustrated as having a single camera in FIGS. 2 and 3, it should be appreciated that camera assembly 192 can include a plurality of cameras positioned within and/or coupled (e.g., mounted) to cabinet 102, wherein each of the plurality of cameras has a specified monitoring zone or monitoring range positioned around fresh food chamber 122. In this regard, for example, the field of view of each camera assembly 192 can be limited to, directed to, or focused on a certain monitoring zone, monitoring range, or a specific area within fresh food chamber 122. Specifically, cameras can be mounted to a sidewall of fresh food chamber 122 and can be spaced apart along the vertical direction V to cover different monitoring zones.

Notably, however, it can be desirable to position each camera assembly 192 proximate the front opening of fresh food chamber 122 and orient each camera assembly 192 such that the field of view of each camera assembly 192 is directed into fresh food chamber 122. In this manner, privacy concerns related to obtaining images of the user of the refrigerator appliance 100 can be mitigated or avoided altogether. According to example embodiments, camera assembly 192 can be used to facilitate an inventory management process for refrigerator appliance 100. As such, each camera assembly 192 can be positioned at an opening to fresh food chamber 122 to monitor objects 194 (e.g., food items, beverages) that are being added to or removed from fresh food chamber 122.

According to still other embodiments, each camera assembly 192 can be oriented in any other suitable manner for monitoring any other suitable region within or around refrigerator appliance 100. It should be appreciated that according to alternative embodiments, camera assembly 192 can include any suitable number, type, size, and configuration of camera(s) for obtaining images of any suitable areas or regions within or around refrigerator appliance 100. In addition, it should be appreciated that each camera assembly 192 can include features for adjusting its field of view and/or orientation.

It should be appreciated that the images, video, and/or audio obtained by camera assembly 192 can vary in number, frequency, angle, resolution, detail, etc. in order to improve the clarity of the particular regions surrounding or within refrigerator appliance 100. In addition, according to example embodiments, controller 156 can be configured to illuminate the chilled chamber using one or more light sources prior to obtaining images. Notably, controller 156 of refrigerator appliance 100 (or any other suitable dedicated controller) can be communicatively coupled to camera assembly 192 and can be programmed or configured for analyzing the images obtained by camera assembly 192, e.g., in order to identify items being added or removed from refrigerator appliance 100, as described in detail below.

In general, controller 156 can be coupled (e.g., electrically, communicatively, operatively) to camera assembly 192 for analyzing one or more images, video, and/or audio obtained by camera assembly 192 to extract useful information regarding objects 194 located within fresh food chamber 122. In this regard, for example, images, video, and/or audio obtained by camera assembly 192 can be used to extract a barcode, identify a product, monitor the motion of the product, or obtain other product information related to object 194. Notably, this analysis can be performed locally (e.g., on controller 156) or can be transmitted to a remote server (e.g., remote server 186 via external communication system 180) for analysis. Such analysis is intended to facilitate inventory management, e.g., by identifying a food item being added to and/or removed from the chilled chamber.

Referring again to FIGS. 3 through 6, a lighting assembly 200 that may be used with refrigerator appliance 100 will be described according to exemplary embodiments of the present subject matter. Specifically, as explained briefly above, lighting assembly 200 is generally intended to provide an improved user experience with refrigerator appliance 100, e.g., by providing intuitive feedback to the user regarding the location of one or more objects (e.g., identified generally by reference numerals 194) within refrigerator appliance 100. In addition, lighting assembly 200 may be used to identify ingredients for a recipe, identify spoiled or expiring food, or to provide any other useful information to the user of refrigerator appliance 100.

Figure 5:
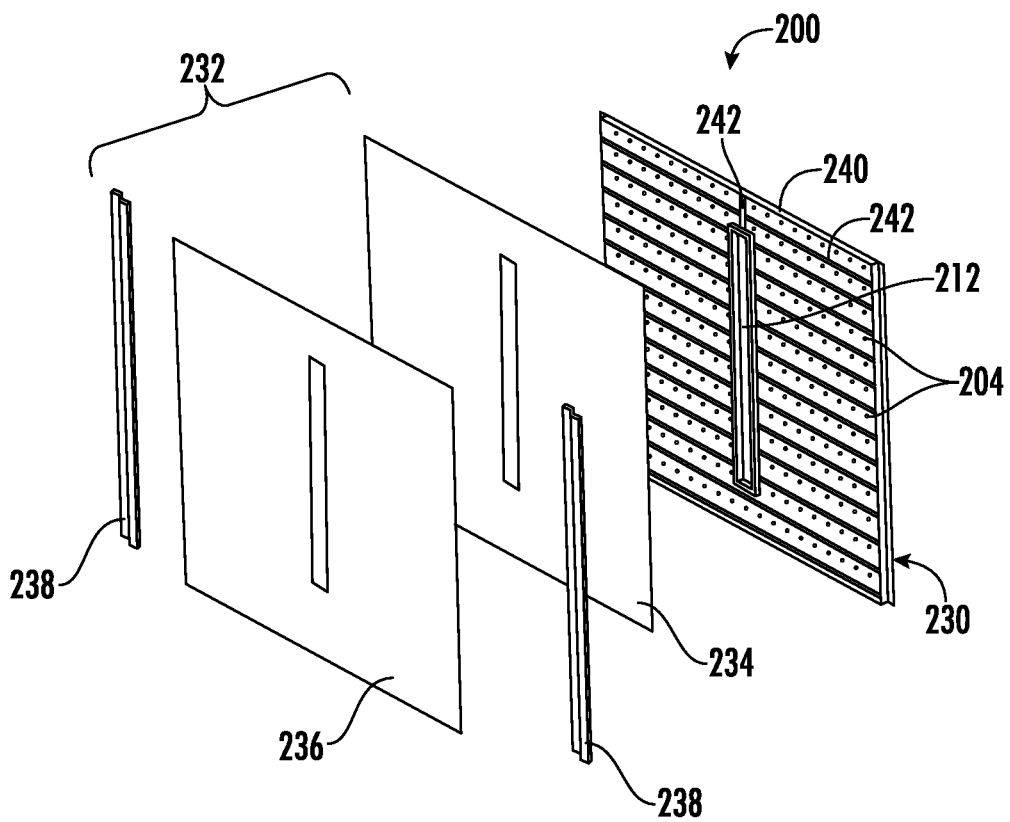
FIG. 5 provides an exploded view of the exemplary lighting assembly of FIG. 4 according to an exemplary embodiment of the present subject matter.
Figure 6:
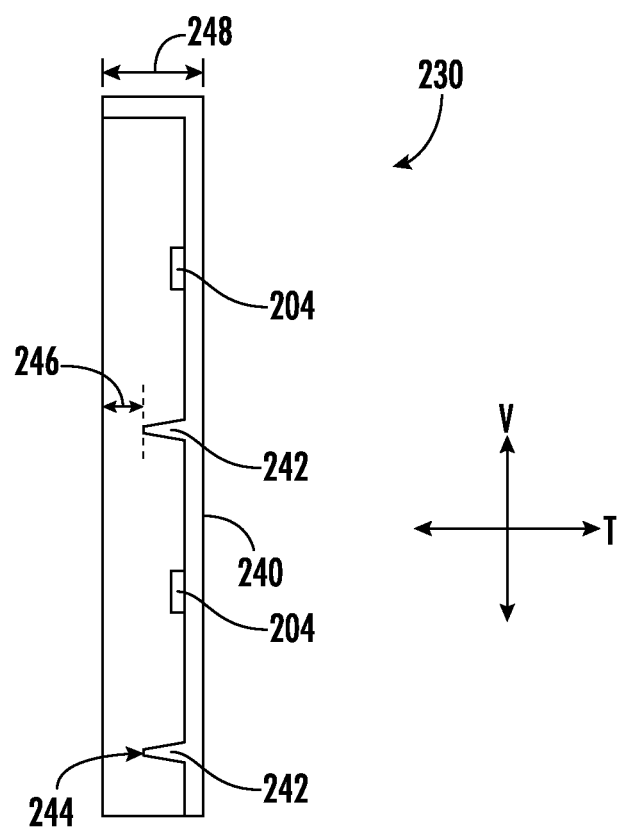
FIG. 6 provides a cross-sectional view of a backlight frame of the exemplary lighting assembly of FIG. 5 according to an exemplary embodiment of the present subject matter.

Specifically, as best shown in FIGS. 5 and 6, lighting assembly 200 generally includes a plurality of light sources 204 positioned throughout fresh food chamber 122. Notably, controller 156 may be configured for operating lighting assembly 200 in order to provide useful information to a consumer or user of refrigerator appliance 100. In this regard, for example, it may be useful to a user of refrigerator appliance 100 to know the location of particular objects 194 within the chilled chamber. In this regard, according to exemplary embodiments, light sources 204 may be illuminated in those locations, e.g., to isolate and illuminate that particular zone to draw or focus a user's attention.

As used herein, the term "light sources" or the like may be used generally to refer to any suitable source of light for illuminating a refrigerator appliance 100 in any suitable manner. For example, light sources 204 may include any suitable number, type, position, and configuration of electrical light source(s), using any suitable light technology and illuminating in any suitable color. For example, according to the illustrated embodiment, light sources 204 includes one or more light emitting diodes (LEDs), which may each illuminate in a single color (e.g., white LEDs), or which may each illuminate in multiple colors (e.g., multi-color or RGB LEDs) depending on the control signal from controller 156. However, it should be appreciated that according to alternative embodiments, light sources 204 may include any other suitable traditional light bulbs or sources, such as halogen bulbs, fluorescent bulbs, incandescent bulbs, glow bars, a fiber light source, etc. In addition, it should be appreciated that refrigerator appliance 100 may include additional lighting, such as general chamber lighting that may illuminate the entire fresh food chamber 122 and/or freezer chamber 124.

According to the illustrated embodiment, fresh food chamber 122 may generally comprise a plurality of storage locations (e.g., identified generally herein by reference numeral 210). In this regard, storage locations 210 may be generally defined by bins 134, shelves 136, or other regions within fresh food chamber 122. In this regard, referring briefly to FIG. 3, storage locations 210 may generally be bounded by a liner of refrigerator appliance 100 and may be defined at least part by shelves 136 and/or a center mounting bracket 212 positioned on an illuminated rear wall 214 of fresh food chamber 122. According to still other embodiments, each of these storage locations 210 may be subdivided into any suitable regions or zones. Accordingly, storage locations 210 generally refer to any location within fresh food chamber 122 where a food item or object 194 may be stored and which may be identified using lighting assembly 200, as described in more detail below.

In this regard, referring still to FIG. 3, lighting assembly 200 may include a plurality of lighting zones 220 that correspond to the plurality of storage locations 210. In this regard, lighting zones 220 may generally be defined as the portions of illuminated rear wall 214 that correspond to a footprint of storage locations 210 when viewed from the front of refrigerator appliance 100. As explained in more detail below, controller 156 may be in operative communication with lighting assembly 200 and may selectively illuminate lighting zones 220 to identify or draw a user's attention to a particular storage location 210, e.g., a storage location 210 that contains an item or object 194 the user is wishing to access.

In addition to lighting zones 220 located on illuminated rear wall 214, lighting assembly 200 may include other lighting zones 220 at other locations within refrigerator appliance 100. For example, as shown in FIG. 3, a top perimeter of each storage bin 134 may include a light strip or light sources 204 that define a bin lighting zone 220. In addition, each of the storage shelves may include a front is that is illuminated as part of a lighting zone 220, each drawer may have a lighting zone 220, etc.

Although four exemplary lighting zones 220 are identified on the illuminated rear wall 214 of fresh food chamber 122 and one lighting zone 220 is identified on storage bin 134, it should be appreciated that lighting assembly 200 may be split up into any other suitable number, size, and configuration of lighting zones 220 while remaining within the scope of the present subject matter. In addition, it should be appreciated that each of the lighting zones 220 may be configured to be independently illuminated and may be adjustable in at least one of color, intensity, flashing pattern, etc. Other variations to lighting assembly 200 are possible and within the scope of the present subject matter.

Figure 4:
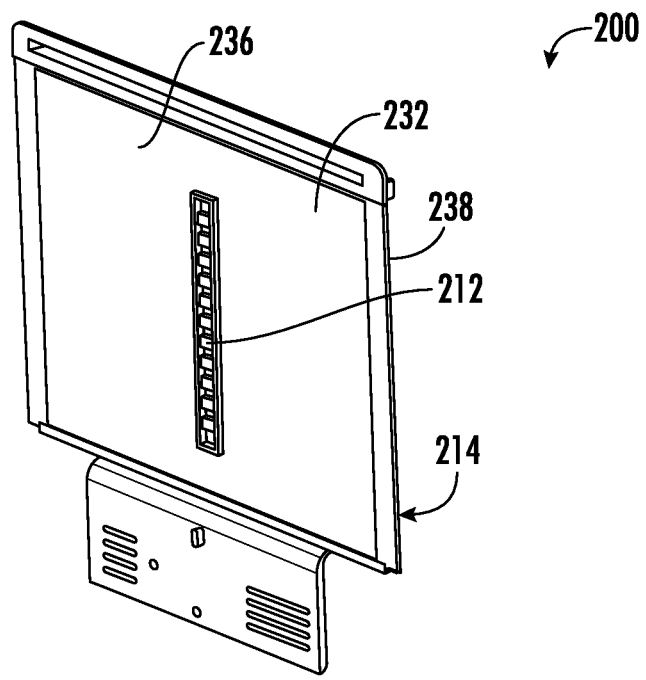
FIG. 4 provides a perspective view of a lighting assembly of the exemplary refrigerator appliance of FIG. 1 according to an exemplary embodiment of the present subject matter.

Referring now specifically to FIGS. 4 through 6, light sources 204 of lighting assembly 200 may generally be oriented in a matrix of rows and columns. Lighting assembly 200 may further include a plurality of driver boards (not shown) for selectively operating one or more light sources 204. Specifically, according to an example embodiment, each of the driver boards may be operably coupled to a subset of the matrix of light sources 204. In this manner, controller 156 may operate the driver boards to selectively illuminate light sources 204. In this manner, controller 156 may illuminate a single light source 204 or a group of light sources 204 as desirable to define one or more lighting zones 220.

As shown, illuminated rear wall 214 may generally include a backlight frame 230, where the light sources 204 may be mounted directly to backlight frame 230. In addition, a cover 232 may be positioned over backlight frame 230 and the plurality of light source 204 to generally form illuminated rear wall 214. According to the illustrated embodiment, cover 232 may generally include a diffuser panel 234 that serves to defuse light generated by light sources 204 and a transparent or semitransparent structural cover 236 positioned over diffuser panel 234. In addition, cover 232 may include side trim pieces 238 that are generally configured for securing cover 232 to backlight frame 230 and to prevent light bleed out the edge of illuminated rear wall 214. Other constructions of illuminated rear wall 214 are possible and within the scope of the present subject matter.

Notably, it may be desirable to prevent excessive light bleed between adjacent lighting zones 220, e.g., to provide a more defined boundary of each lighting zone 220. Accordingly, backlight frame 230 may generally include back panel 240 and a plurality of divider ribs 242 that extend from back panel 244 and cover 232. In this regard, for example, divider ribs 242 may be positioned between the plurality of light sources 204 to define a particular illumination region for each particular light source 204. For example, divider ribs 242 may extend along the horizontal direction between each row of light sources 204 and/or along the vertical direction V between each column of light sources 204. In this manner, controller 156 may have discrete control of each light source 204 and may selectively illuminate light sources 204 to define any suitable lighting zone 220.

According to the illustrated embodiment, divider ribs 242 may extend toward cover 232 and define a distal end 244. As shown, a gap 246 may be defined between distal end 244 of divider ribs 242 and a front surface of backlight frame 230. Notably, the size of gap 246 may be adjusted to regulate the amount of light bleed between lighting zones 220. For example, it may be desirable to permit some light bleed to present a harsh dark line where divider ribs 242 contact cover 232. By contrast, gap 246 may be designed such that there is a suitable amount of overlap to enable defined lighting zones 220. For example, gap 246 may be between about 10% and 75%, between about 20% and 60%, between about 30% and 50%, or about 40% of a frame depth 248.

Now that the construction and configuration of refrigerator appliance 100 and lighting assembly 200 have been presented according to an exemplary embodiment of the present subject matter, an exemplary method 300 for operating a lighting assembly in a refrigerator appliance is provided. Method 300 can be used to operate lighting assembly 200 or to operate any other lighting assembly. In this regard, for example, controller 156 may be configured for implementing method 300. However, it should be appreciated that the exemplary method 300 is discussed herein only to describe exemplary aspects of the present subject matter and is not intended to be limiting.

Figure 7:
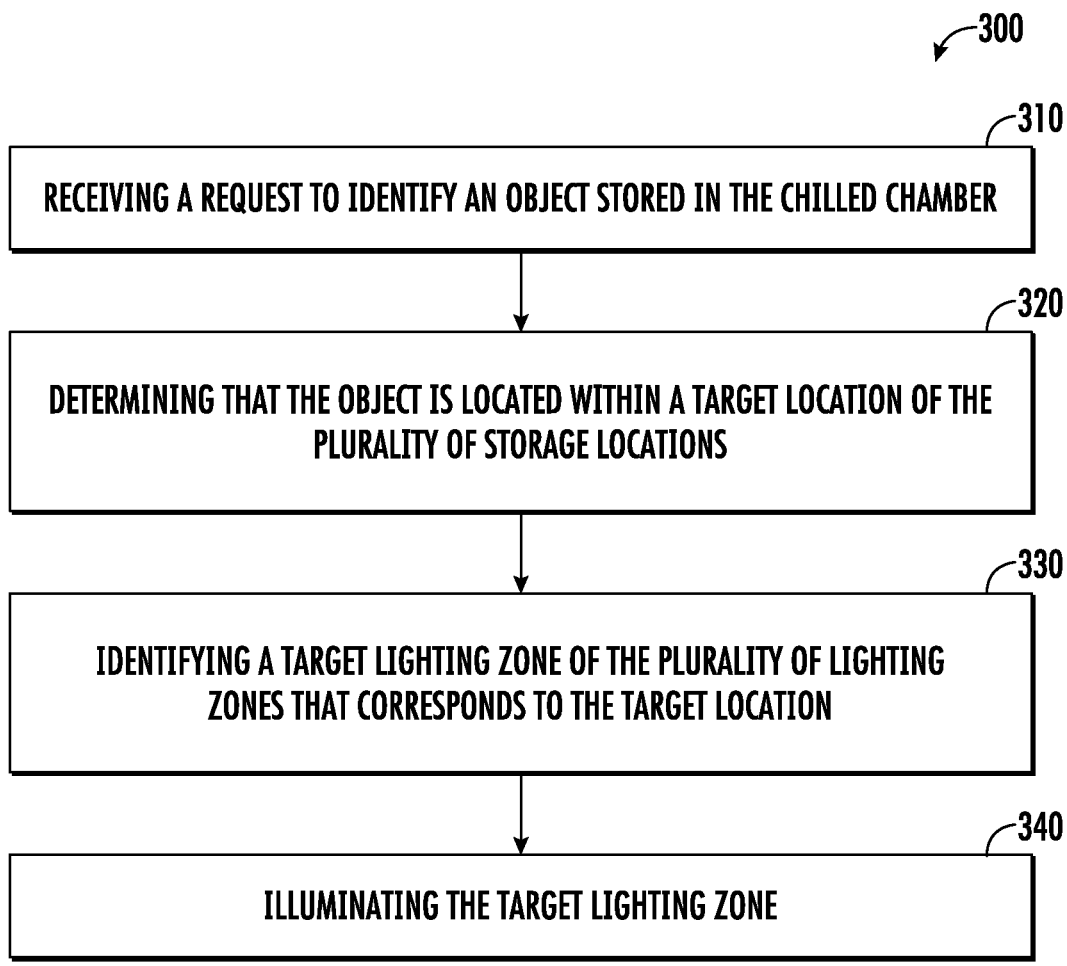
FIG. 7 provides a method of operating a refrigerator appliance and a lighting assembly according to an exemplary embodiment of the present subject matter.

As shown in FIG. 7, method 300 includes, at step 310, receiving a request to identify an object stored in the chilled chamber. In this regard, continuing the example from above, a user of refrigerator appliance 100 may wish to access an object 194 that is positioned within fresh food chamber 122. Accordingly, the user may communicate with controller 156 to request that object 194 be located and identified for the user to quickly and easily access the object 194. According to example embodiments, the request to identify the object may include receiving a voice command from a user of refrigerator appliance 100. For example, when a user opens refrigerator door 128, a microphone (not shown) may listen for user prompts or requests. A user may state "where are my apples?" or may state "show me the eggs," and the lighting zone 220 associated with those items may be illuminated.

According to still other embodiments, the request to identify the object of the chilled chamber may include detecting a user initiation of a recipe including the object. For example, a user may use a software application on remote device 182 to initiate a cooking operation that involves a recipe. Controller 156 may detect the initiation of the recipe and may automatically illuminate all ingredients needed for the recipe.

According to still other embodiments, the request to identify an object may be automated based on the expiration or spoilage of an object 194 within fresh food chamber 122. For example, if the milk or eggs are approaching their expiration date, the corresponding lighting zone 220 may flash or indicate a warning color to prompt the user to remove such items. For example, controller 156 may implement an inventory management system for tracking system that has knowledge of when an item was added and its expiration date. Controller 156 may thereby identify food items that are approaching their expiration and may illuminate a target lighting zone 220 associated with these items.

Referring again to FIG. 7, step 320 may generally include determining that the object is located within a target location of the plurality of storage locations. In this regard, controller 156 may use an inventory management system 190 or an inventory tracking system to obtain the specific storage location 210 of the object 194 being requested. In this regard, as explained briefly above, refrigerator appliance 100 may include a camera assembly 192 may be generally used to track inventory as it passes into and/or out of fresh food chamber 122. This location information may be used to identify a target storage location 210 and corresponding lighting zone 220.

Step 330 may include identifying a target lighting zone of the plurality of lighting zone that corresponds to the target location of the object. Once the target lighting zone has been identified, step 340 may include illuminating the target lighting zone. It should be appreciated that the illumination of the target lighting zone may include changing the operation of light sources 204 to identify a location of object 194. For example, light sources 204 not located within the target lighting zone 220 may maintain general chamber illumination while light sources 204 within the target lighting zone 220 may illuminate in a manner that differentiates that particular zone, such as supplying brighter light, a different color, a flashing light, etc.

Notably, method 300 may further include a calibration process for identifying the location and mapping of each light source 204 of lighting assembly 200. In this manner, controller 156 may selectively illuminate each of light sources 204 and may monitor the illumination of light sources 204 using camera assembly 192. In this manner, controller 156 may match the locations of each light source for later recall when implementing method 300. In addition, camera assembly 192 may be used to identify a position of shelves 136, bins 134, or other storage features within refrigerator appliance 100. In this manner, each of the plurality of lighting zones 220 may be adjusted based on the position of such shelves and bins.

FIG. 7 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using refrigerator appliance 100 and lighting assembly 200 as an example, it should be appreciated that these methods may be applied to the operation of any suitable appliance and/or lighting assembly.

As explained herein, aspects of the present subject matter are directed to a lighting system in a refrigerator that selectively lights certain areas to guide a consumer to a particular location (e.g., a particular shelf, one side of the refrigerator, a particular drawer or bin, etc.) within the refrigerator. The lighting system may be broken up into multiple smaller zones that individually illuminate with different colors and/or intensities. The zonal lighting may be used to highlight the location of food item that might be obstructed from the consumer's view and/or aid in the location of the item.

The zonal back wall illumination system may include either an edge-lit style light or a traditional backlight where the optical axis of the LEDs projects from the back wall of a cavity directly through a diffusing element to illuminate the refrigerator cavity. A physical element may be positioned between each zone to prevent light bleeding from one zone to another unintentionally. The light sources may be RGB multi-color LEDs or individual monochromatic LEDs. The zones may be sized to match the height of the spacing between shelf locations and half of the cavity width. The individual zones may be much smaller and multiple zones may be illuminated together to give an appearance of a larger zone for a better spatial resolution if desired for the illumination.

In operation, consumers may select a food item to locate via the mobile software application and/or voice commands. An inventory management system may locate the food item within the refrigerator and illuminate the proper zone with a different color to bring attention to that area within the refrigerator. The notification color may be predetermined or customizable by the consumer. The inventory management system may give a different illuminated notification automatically when the consumer opens the refrigerator to indicate a food item that is expiring soon. The separate lightning system may also be applied underneath door bins to illuminate down into the bin to highlight food items on the doors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
a cabinet;
a chilled chamber defined within the cabinet, the chilled chamber comprising a plurality of storage locations;
a lighting assembly comprising a plurality of lighting zones corresponding to the plurality of storage locations, the lighting assembly comprises:
a backlight frame comprising a back panel and a plurality of divider ribs extending from the back panel toward a cover and being positioned between the plurality of light sources to define the plurality of lighting zones;
a plurality of light sources mounted on the backlight frame; and
the cover positioned over the backlight frame and the plurality of light sources; and
a controller in operative communication with the lighting assembly, the controller being configured to:
receive a request to identify an object stored in the chilled chamber;
determine that the object is located within a target location of the plurality of storage locations;
identify a target lighting zone of the plurality of lighting zones that corresponds to the target location; and
illuminate the target lighting zone.

2. The refrigerator appliance of claim 1, wherein the request to identify the object stored in the chilled chamber comprises:
receiving a voice command from a user of the refrigerator appliance.

3. The refrigerator appliance of claim 1, wherein the request to identify the object stored in the chilled chamber comprises:
detecting a user initiation of a recipe including the object.

4. The refrigerator appliance of claim 1, wherein the controller is in operative communication with a remote device through an external network, and wherein the request to identify the object stored in the chilled chamber is provided through the remote device.

5. The refrigerator appliance of claim 1, wherein determining that the object is located within the target location of the plurality of storage locations comprises:
obtaining the target location using an inventory tracking system of the refrigerator appliance.

6. The refrigerator appliance of claim 1, wherein each of the plurality of lighting zones is configured to be independently illuminated.

7. The refrigerator appliance of claim 1, wherein the lighting assembly comprises a plurality of light sources that are adjustable in at least one of color or intensity.

8. The refrigerator appliance of claim 1, wherein the controller is further configured to:
identify a food item that is approaching expiration or spoilage; and
illuminating the target lighting zone containing the food item.

9. The refrigerator appliance of claim 1, wherein the lighting assembly comprises:
at least one of an illuminated rear wall, illuminated storage bins, or illuminated drawers.

10. The refrigerator appliance of claim 1, wherein the lighting assembly comprises:
a plurality of light sources oriented in a matrix of rows and columns; and
a plurality of driver boards, each of the plurality of driver boards being operatively coupled to a subset of the matrix of the plurality of light sources.

11. The refrigerator appliance of claim 1, wherein the plurality of divider ribs extend to a distal end, and wherein a gap is defined between the distal end of plurality of ribs and a front surface of the backlight frame.

12. The refrigerator appliance of claim 11, wherein the gap is between about 30% and 50% of a frame depth.

13. The refrigerator appliance of claim 1, further comprising a camera assembly coupled to the cabinet and operable to monitor the chilled chamber, the controller being in operative communication with the camera assembly and being configured to perform a calibration process, the calibration process comprising:
    selectively illuminating a plurality of light sources of the lighting assembly; and
    monitoring the illumination of the plurality of light sources using the camera assembly to map locations of the plurality of light sources as the plurality of light sources are selectively illuminated.

14. The refrigerator appliance of claim 1, further comprising a camera assembly coupled to the cabinet and operable to monitor the chilled chamber, the controller being in operative communication with the camera assembly and being configured to:
    identify a position of a shelf within the chilled chamber; and
    adjust the plurality of lighting zones based on the position of the shelf.

15. A method of operating a lighting assembly of a refrigerator appliance, the refrigerator appliance comprising a chilled chamber defined within a cabinet, the chilled chamber comprising a plurality of storage locations, the lighting assembly comprising a plurality of lighting zones corresponding to the plurality of storage locations, and a camera assembly coupled to the cabinet and operable to monitor the chilled chamber, the method comprising:
    performing a calibration process comprising:
        selectively illuminating a plurality of light sources of the lighting assembly; and
        monitoring the illumination of the plurality of light sources using the camera assembly to map locations of the plurality of light sources as the plurality of light sources are selectively illuminated;
    receiving a request to identify an object stored in the chilled chamber;
    determining that the object is located within a target location of the plurality of storage locations;
    identifying a target lighting zone of the plurality of lighting zones that corresponds to the target location; and
    illuminating the target lighting zone.

16. The method of claim 15, wherein the request to identify the object stored in the chilled chamber comprises:
    receiving a voice command from a user of the refrigerator appliance or detecting a user initiation of a recipe including the object.

17. The method of claim 15, wherein each of the plurality of lighting zones is configured to be independently illuminated and is adjustable in at least one of color or intensity.

18. A refrigerator appliance comprising:
    a cabinet;
    a chilled chamber defined within the cabinet, the chilled chamber comprising a plurality of storage locations;
    a lighting assembly comprising a plurality of lighting zones corresponding to the plurality of storage locations;
    a camera assembly coupled to the cabinet and operable to monitor the chilled chamber; and
    a controller in operative communication with the lighting assembly, the controller being configured to:
        receive a request to identify an object stored in the chilled chamber;
        determine that the object is located within a target location of the plurality of storage locations;
        identify a target lighting zone of the plurality of lighting zones that corresponds to the target location;
        illuminate the target lighting zone;
        identify a position of a shelf within the chilled chamber; and
        adjust the plurality of lighting zones based on the position of the shelf.

19. The refrigerator appliance of claim 18, wherein the request to identify the object stored in the chilled chamber comprises:
    receiving a voice command from a user of the refrigerator appliance.

20. The refrigerator appliance of claim 18, wherein the request to identify the object stored in the chilled chamber comprises:
    detecting a user initiation of a recipe including the object.

* * * * *